Figure 1:
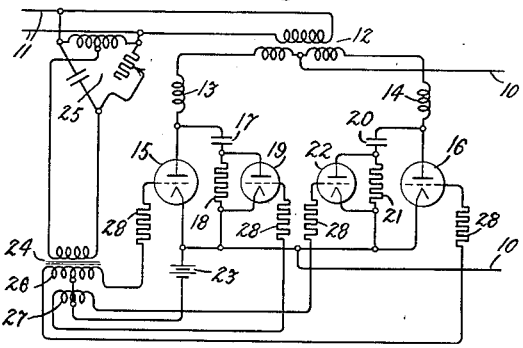

May 28, 1940.   W. SPIELHAGEN   2,202,720
ELECTRIC VALVE CONVERTING SYSTEM
Filed June 28, 1938   2 Sheets-Sheet 1

Inventor:
Walter Spielhagen,
by Harry E. Dunham
His Attorney.

May 28, 1940.                W. SPIELHAGEN                2,202,720
ELECTRIC VALVE CONVERTING SYSTEM
Filed June 28, 1938                2 Sheets-Sheet 2
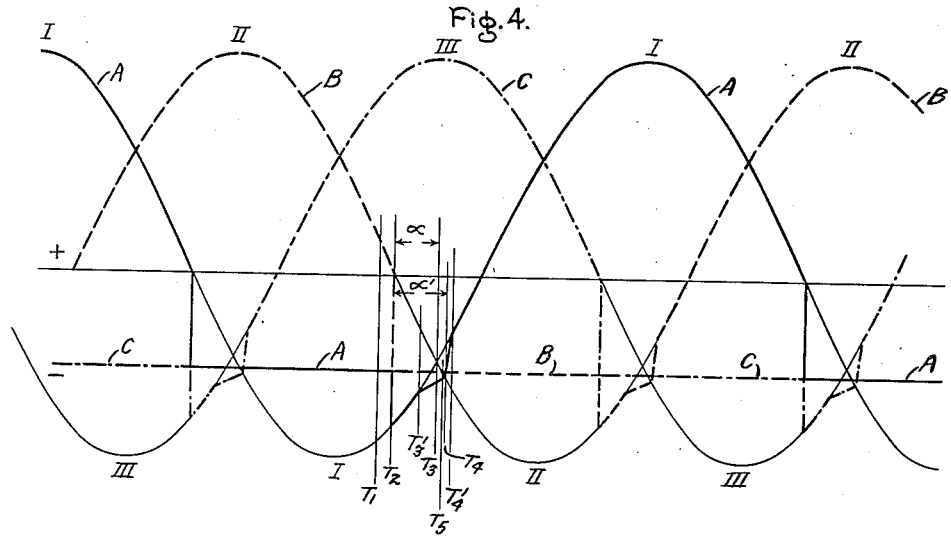
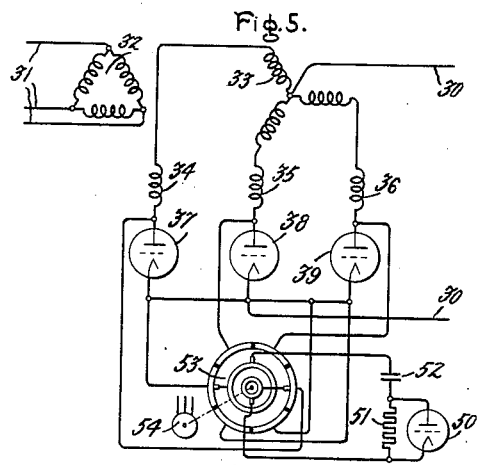
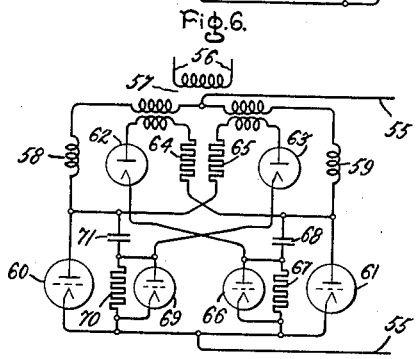
Inventor:
Walter Spielhagen,
by Harry E. Dunham
His Attorney.

Patented May 28, 1940

2,202,720

UNITED STATES PATENT OFFICE 2,202,720

ELECTRIC VALVE CONVERTING SYSTEM

Walter Spielhagen, Berlin-Lichterfelde, Germany, assignor to General Electric Company, a corporation of New York Application June 28, 1938, Serial No. 216,328
In Germany July 9, 1937

10 Claims. (Cl. 175—363)

My invention relates to electric valve converting systems and more particularly to an arrangement for producing rapid deionization of the valves in said system in order to extend the range of power factor values over which the system may operate.

It is well known that the deionization time of an electric valve plays an important part during the commutation period in which current is transferred from one valve to another in an electric valve converting system. This is particularly true in inverter operation where it is desired to keep the deionization time as small as possible in order to obtain reliable commutation of the current to the next succeeding phase and also to reduce the ignition advance angle and therefore the leading reactive power which is not desirable when the alternating current load is of an inductive nature. In grid controlled electric valve apparatus it has been suggested that the deionization time may be reduced by applying to the grids a high negative potential but obviously this requires an increase in the power rating of the grid controlled circuit. It has also been suggested that the commutation period could be reduced by utilizing synchronous switches or by introducing additional voltages into the circuit during the commutation period. In accordance with my invention it is possible to reduce the time necessary for deionization of the valve by rapidly reducing the potential of the anode to a negative value at the end of its period of conductivity. This is accomplished by arranging a capacitor in parallel with the electric valve so that it is charged during the normal conducting period of the valve and discharged at the end of the normal conducting period by an auxiliarly electric valve which is controlled so as to determine the time at which the capacitor will discharge. This capacitor cooperates with an inductor connected in the anode lead of the main valve to rapidly deionize the valve.

It is an object of my invention to provide an improved electric power converting apparatus which will overcome certain disadvantages of the arrangements of the prior art and which will be simple, economical and reliable in operation.

Another object of my invention is to provide an improved electric valve converting apparatus which will be capable of operating under lagging and leading power factor conditions on an alternating current circuit for both inverter and rectifier operation.

Figure 2:
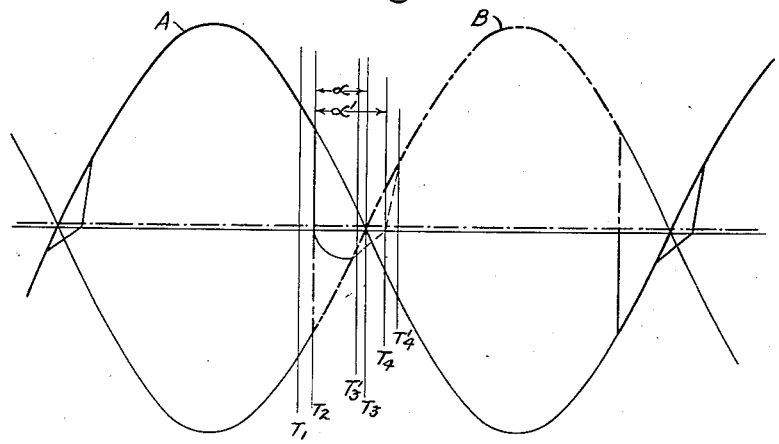
Figure 3:
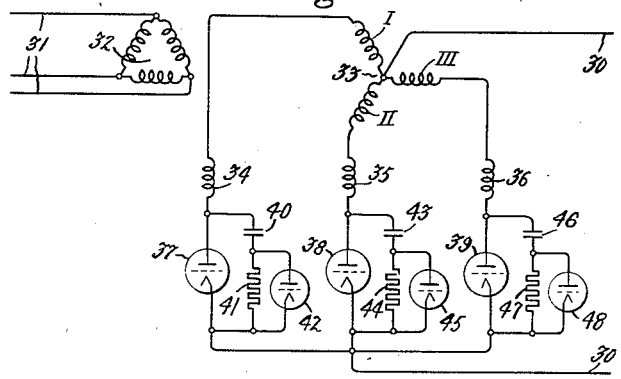

A better understanding of my invention together with other and further objects thereof may be had by reference to the following description taken in connection with the accompanying drawings and its scope will be pointed out in the appended claims. Fig. 1 illustrates the application of my invention to a single phase inverter or rectifier; Fig. 2 is a curve explanatory of the mode of operation of my invention; Fig. 3 shows the application of my invention to a polyphase rectifier or inverter system; Fig. 4 shows curves illustrating the operation of the arrangement shown in Fig. 3; and Figs. 5 and 6 illustrate further modifications which may be made in my invention.

Referring to Fig. 1 of the drawings, I have shown the application of my invention to an electric valve converting system for transferring energy between a direct current circuit 10 and an alternating current circuit 11. For the purposes of illustration my invention will be explained as being applied to electric valve converting systems of the inverter type although it is to be understood that the invention is equally applicable to apparatus operating as rectifiers. This apparatus includes a transformer 12 the secondary winding of which is connected to the alternating current circuit 11 and the primary winding of which is provided with a midpoint connected to one side of the direct current circuit 10. The outer extremities of the primary winding of the transformer 12 are connected through a plurality of inductors 13 and 14 to the anodes of a pair of valves 15 and 16 the cathodes of which are connected to the other side of the direct current circuit 10. A capacitor 17 is arranged in a charging circuit which includes an impedance 18 connected in series therewith so that this charging circuit is in parallel to the electric valve 15. The discharging circuit for the capacitor 17 includes an auxiliary electric valve 19 arranged in parallel to the impedance 18. A similar capacitor 20 is provided for the electric valve 16 and this capacitor is arranged in a charging circuit including an impedance 21 so that the charging circuit is in parallel to the electric valve 16. An auxiliary valve 22 arranged in parallel to the impedance 21 comprises the discharging circuit for the capacitor 20. The various valves 15, 16, 19 and 22 are controlled by a control circuit which includes a source of biasing potential 23 and a transformer 24 the primary winding of which is energized from a suitable phase shifting circuit 25 which is connected to the alternating current circuit 11. The transformer 24 has two secondary windings, one winding 26 being arranged to control the conductivities of the valves 15 and 16 and the other winding 27 being arranged to control the conductivities of the valves 19 and 22. If desired, each of the grid-to-cathode circuits of the various valves may include suitable current limiting resistors such as 28.

In operation the main electric valves 15 and 16 are alternately rendered conductive and nonconductive so that current is alternately transmitted through the left-hand and right-hand portions of the primary winding of the transformer 12 thereby causing alternating current to appear in the secondary winding of the transformer, which winding is connected to the alternating current circuit 11. This form of inverter operation is believed to be obvious to those skilled in the art and the manner of operation of the other portions of the circuit will become apparent by reference to the curves shown in Fig. 2. In this figure, the curves A and B indicate the electromotive force against which the valves 16 and 15, respectively must operate. It will be assumed that the valve 15 is already conductive and that the voltage across this valve is represented by the curve B. The period of conductivity of this valve is nearing its end at the point $T_1$ shown in the curve. Shortly thereafter at the point $T_2$ the voltages supplied by the secondary winding 26 of the transformer 24 are such as to render conductive the electric valve 16 if it is assumed that we have an inverter not provided with the auxiliary elements and valves 17 to 21. From this figure it will be apparent that the voltage of the anode of the valve 15 with respect to its cathode will be negative from the time $T_2$ until the time $T_3$ whereupon it may again become positive. The distance from $T_2$ to $T_3$ represents the angle of commutation necessary in order to operate the usual inverter. This is the time which must be provided in order to obtain deionization of the previously conducting valve. This angle has been denoted as $\alpha$ in Fig. 2. On the other hand, if the capacitor 17 is connected in series with the impedance 18 across the discharge valve 15 in accordance with my invention the following operation will occur. The capacitor will charge during the time $T_2$ to $T'_3$ at which time the charge across the capacitor is equal to the potential appearing across the valve 15. Meanwhile the auxiliary discharge valve 19 has been rendered conductive as early as $T_2$ and the current flow through the capacitor 17 reverses through the valve 19 and continues to discharge during the period $T'_3$ to $T_4$. The result is that the potential of the anode of the valve 15 is maintained negative up to the time $T_4$. A negative potential is applied to the control electrode of the valve 15 at the same time that a positive potential is applied to the auxiliary control valve 19 with the result that at the time that the anode becomes positive the control electrode of the valve 15 again regains control thereby stopping the discharge through this valve. By maintaining the anode of the valve 15 at a negative potential from the time $T_2$ to the time $T_4$ the period in which deionization may occur has been materially extended so that the commutation angle is now equal to $\alpha'$. This means that the main electric valve 16 may be rendered conductive at any time during this period or angle $\alpha'$ thus permitting in the case of inverter operation a lagging power factor and in the case of rectifier operation a leading power factor operation of the apparatus.

While for the purposes of illustration the impedance 18 has been shown as being a resistor it is apparent that similar results will be obtained if the element 18 is an inductor or a unilaterally conductive device such as a contact rectifier arranged to permit the charging current to flow. In the event that the impedance device 18 is an inductor it may be possible to omit the anode inductor such as 13.

The arrangement shown in Fig. 3 shows the application of my invention to a three-phase inverter operating between the direct current circuit 30 and the alternating current circuit 31. This inverter includes a transformer having a secondary winding 32 connected to the alternating current circuit 31 and a primary winding 33 arranged in star connection the neutral point of which is connected to one side of the direct current circuit 30. Each of the outer extremities of the secondary winding 32 is connected to one of a plurality of inductors 34, 35, 36 to the anodes of one of a plurality of main electric valves 37, 38 and 39, the cathodes of which are all connected together to the other side of the direct current circuit 30. The valve 37 is provided with a capacitor 40 connected in series with an impedance 41 which is arranged in parallel to the valve so as to form a charging circuit for the capacitor. An auxiliary valve 42 is connected in parallel with the impedance 41. Similarly, the valve 38 is provided with a capacitor 43, impedance 44, and auxiliary valve 45, and valve 39 is provided with capacitor 46, impedance 47 and auxiliary valve 48. The various valves 37, 38, 39 and the auxiliary valves 42, 45 and 48 are controlled in a manner similar to the way the valves in the arrangement shown in Fig. 1 are controlled.

The operation of this arrangement will be apparent to those skilled in the art by an examination of Fig. 4 in which the various windings I, II and III of the polyphase secondary transformer winding 33 have voltage curves corresponding to curves A, B and C. Thus for example, it will be assumed that at the point $T_1$ the valve 37 of Fig. 3 is conductive at the time $T_2$ the valve 38 is rendered conductive and the voltage across the valve 37 reverses in accordance with the curve A and the capacitor 40 is charged through the resistor 41 until the time $T'_3$. From the time $T'_3$ the capacitor 40 is discharged through the auxiliary valve 42 which was rendered conductive at the time $T_2$. In this arrangement the time for deionization has been extended from an angle $\alpha$ to an angle $\alpha'$ which latter angle extends from $T_2$ to $T_4$. At the time $T_4$ the valve 37 is rendered nonconductive because of the negative potential appearing at the control electrode thereof and the voltage across the valve 37 again joins the sinusoidal shape of the curve A at the time $T'_4$.

The control of the various valves shown in the arrangement in Fig. 3 may be effected in any number of ways commonly known to those skilled in the art. In the explanation just given by reference to Fig. 4 the discharge valves have been rendered conductive at a lower point of intersection of the curves A and II; B and III; and C and I respectively, so that the time during which deionization may occur may lie anywhere between the time from the moment $T_2$ at which the next succeeding valve was rendered conductive until commutation of the current actually has been completed. Such operation can be accomplished by a control circuit utilizing a synchronous mechanical distributor. The auxiliary valves 42, 45 and 48 may be rendered conductive by the voltages appearing across the inductors 34, 35 and 36 respectively. With such an arrangement, however, the voltages would deviate somewhat from that shown in Fig. 4.

Where it is desired to reduce the number of valves to a minimum in multiphase converters the arrangement shown in Fig. 5 may be utilized. Although for purposes of example only a three-phase arrangement is shown, obviously of course, in the instance of six phases or a greater number of phases the arrangement will serve to even greater advantage. In Fig. 5 similar elements have been given similar reference characters and in this arrangement only a single auxiliary valve 50 connected in parallel to an impedance 51 and in series with a capacitor 52 serves for all the valves. This is accomplished by utilizing a synchronous distributor 53 which is driven by a motor 54. As each main valve is rendered non-conductive the capacitor, impedance, and auxiliary valve arrangement are switched onto the next succeeding valve so that it may serve to deionize the valve at the end of its period of conductivity. Obviously, such an arrangement is synchronized with the control circuit for the various valves.

In the event that it may be desirable to further prolong the time within which deionization may occur the capacitors may be charged during the conducting periods of the main valves by a synchronous source of current. Such an arrangement is shown in Fig. 6 in which the inverter operates between a direct current circuit 55 and an alternating current circuit 56. A transformer 57 having an output winding connected to the alternating current circuit 56 has a primary winding provided with a midpoint which is connected to one side of the direct current circuit 55. The outer extremities of the primary winding of the transformer 57 are connected through inductors 58 and 59 respectively to the anodes of the valves 60 and 61 which have their cathodes connected together to the other side of the direct current circuit 55. The transformer 57 is also provided with a pair of tertiary windings each of which has one terminal connected to the anode of an auxiliary valve such as 62 and 63. The remaining extremity of the tertiary winding which is connected with one terminal to the anode of the valve 62 is connected through a suitable resistor 64 to the anode of the main valve 61, and similarly the remaining terminal of the tertiary winding which is connected to the anode of the valve 63 is connected through a suitable resistor 65 to the anode of the valve 60. The cathode of the valve 62 is connected to the auxiliary valve 66 which is arranged in parallel to the impedance 67 and which impedance is connected in series with the capacitor 68 across the valve 61. The cathode of the valve 63 is connected to the anode of the auxiliary valve 69 which is connected in parallel to the impedance 70 and which impedance is connected in series with the capacitor 71 across the valve 60. The valves 62 and 63 therefore operate to permit the capacitors 68 and 71 to be charged only during the normal current conducting period of the main valves 60 and 61.

My invention, which for the purposes of illustration has been shown as applied to the numerous arrangements, is capable of being embodied in many other electric valve converting systems well known in the art, and when so utilized will provide rapid deionization of the valves thereof so that in the case of inverters they may be operated with a lagging power factor on the alternating current side and in the case of rectifiers they may be operated with a leading power factor on the alternating current side.

While I have shown particular applications of my invention to electric valve converting apparatus, it is to be understood that this is merely illustrative of some of the electric valve converting or translating apparatus to which my invention may be applied. It will, of course, be understood that I do not wish to be limited thereto, since it is apparent that the principles herein disclosed are susceptible of numerous other applications, and modifications may be made in the circuit arrangement to which my invention may be applied without departing from the spirit and scope of my invention as set forth in the appended claims.

What I claim as new and desire to secure by Letters Patent of the United States is:

1. The combination in an electric valve converting system comprising a controlled electric valve, serially connected capacitance and impedance means arranged in a charging circuit in parallel relation with said valve, and means in shunt connection with said impedance for short circuiting said impedance near the end of the period of conductivity of said valve.

2. The combination comprising a direct current circuit, an alternating current circuit, and an electric valve converting system interconnecting said circuits, said system including a plurality of main electric valves, each valve being provided with a serially connected capacitor and resistance arranged in a charging circuit in parallel with each of said valves, an auxiliary controlled electric valve arranged in shunt connection with each of said resistances for short circuiting said resistances, and means for rendering conductive each auxiliary valve near the end of the period of conductivity of its associated main valve.

3. The combination comprising a direct current circuit, an alternating current circuit, an electric valve converting system interconnecting said circuits, said system including a plurality of main electric valves, a serially connected capacitor and impedance arranged in parallel relation with said main valves, said capacitor being charged and discharged during each period of conductivity of said valves the charging of said capacitor being controlled by said impedance, an auxiliary controlled valve connected in shunt with said impedance to control the discharge of said capacitor, and means for rendering conductive said auxiliary valve near the end of the period of conductivity of the main valve associated with said capacitor.

4. The combination comprising a direct current circuit, an alternating current circuit, and an electric valve converting system interconnecting said circuits, said system including a plurality of main electric valves, each of said valves being provided with a capacitor connected in series with an impedance to form a charging circuit for said capacitor, said charging circuit being controlled by said impedance and being connected in parallel to said main valve, an auxiliary control valve connected in shunt relation with each of said impedances for controlling the discharge of each of said capacitors, and means for rendering conductive each auxiliary valve near the end of the period of conductivity of its associated main valve.

5. The combination in an electric valve converting system having a plurality of main electric valves, a synchronous distributor, a single capacitor arranged in a charging circuit to be connected by means of said synchronous distributor successively in parallel with each of said valves during the latter portion of its conducting period, a single auxiliary control electric valve arranged in a discharging circuit for said capacitor, and means for periodically rendering conductive said auxiliary valve near the ends of the periods of conductivity of each of the main electric valves.

6. The combination comprising a direct current circuit, an alternating current circuit, an electric valve converting system interconnecting said circuits, said system including a plurality of main electric valves, serially connected capacitor and impedance means arranged to be connected in parallel to each of said valves, said impedance controlling the charging of said capacitor, an auxiliary control electric valve arranged to short circuit said impedances in order to control the discharge of said capacitor, and means for rendering conductive said auxiliary valve near the end of each period of conductivity of the main valve associated with said capacitor.

7. The combination in an electric valve converting system including a plurality of main electric valves, means including a capacitor arranged to be charged in parallel relation with one of said main valves during the period of conductivity thereof, a discharging circuit for said capacitor including an auxiliary controlled electric valve, means for rendering conductive said auxiliary valve near the end of the period of conductivity of the main valve associated with said capacitor, and means for synchronously connecting said capacitor together with its charging and discharging circuits in parallel with each of said different main electric valves during their respective periods of conductivity.

8. The combination in an electric valve converting system comprising a main controlled electric valve, serially connected capacitor and impedance means arranged in a charging circuit in parallel relation with said valve, and an auxiliary controlled electric valve connected in shunt relation with said impedance for short circuiting said impedance at predetermined times in order to extend the period in which deionization of the main controlled electric valve may occur.

9. The combination comprising a direct current circuit, an alternating current circuit, an electric valve converting system interconnecting said circuits, said system including a plurality of main controlled electric valves, means for periodically maintaining the anode potentials relative to the cathode of said main valves negative for a period in excess of the normal deionization time of said main valve comprising a serially connected capacitor and resistance connected in a charging circuit in parallel with the main valve, and means for periodically short circuiting said resistance.

10. The combination comprising a direct current circuit, an alternating current circuit, and an electric valve converting system interconnecting said circuits, said system including a main controlled electric valve, means comprising a serially connected capacitor and resistance arranged in a charging circuit in parallel relation with said main valve, and means for short circuiting said resistance at periodic intervals in order to extend the period in which deionization of the main valve may occur.

WALTER SPIELHAGEN.